Patented Aug. 11, 1953

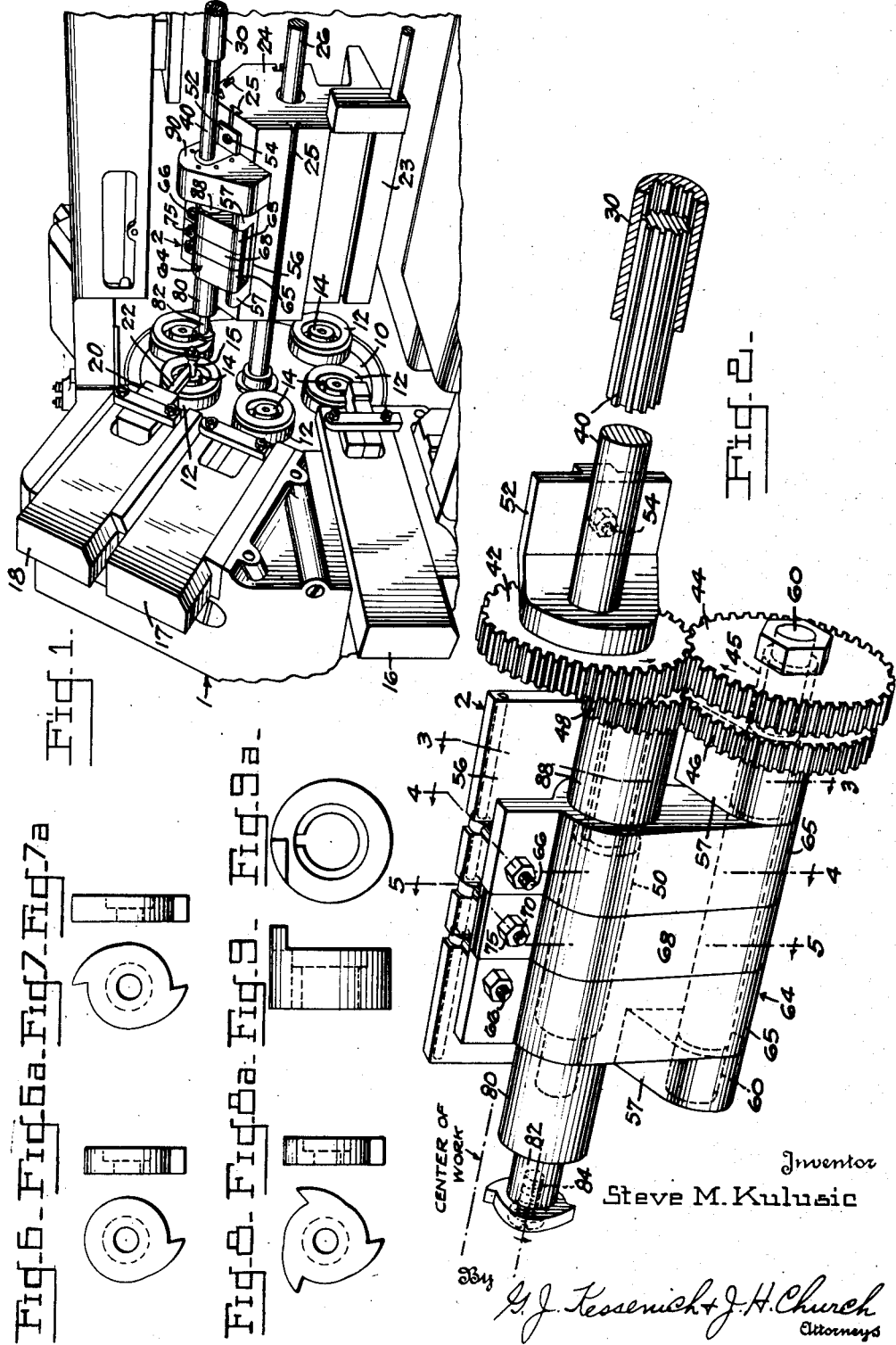

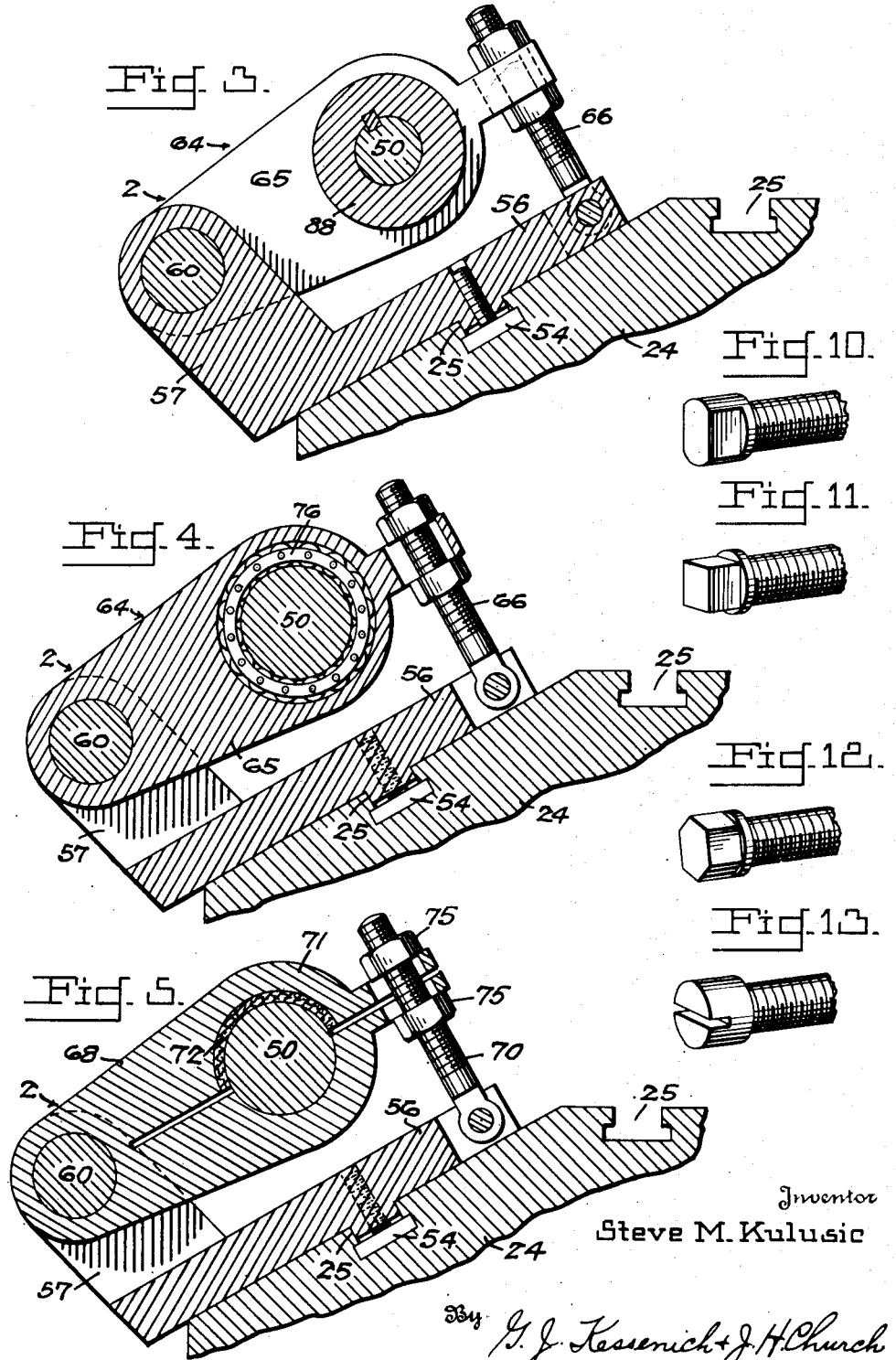

2,648,259

UNITED STATES PATENT OFFICE 2,648,259

ATTACHMENT FOR MILLING OR SLOTTING METAL PARTS

Steve M. Kulusic, Hazel Park, Mich.

Application October 19, 1950, Serial No. 191,057

6 Claims. (Cl. 90—11)

(Granted under Title 35, U. S. Code (1952), sec. 266)

This invention relates broadly to the art of shape turning machined metal parts involving the cutting of flat sides thereon or of straight slots in the ends of such parts. More particularly, this invention pertains to an apparatus utilizing a rotary cutter for the shape turning of slotted ends, or of flat sides on at least a portion of the length, of machined metal parts.

The production of flat sides or of slotted ends on machined metal parts, for example the production of square, hexagonal, octagonal or slotted heads on parts manufactured on machines such as on multiple-spindle automatic screw machines, has heretofore required a second or additional subsequent or prior operation separate and apart from the first or normal operation performed by the machines and at a time other than during the latter.

It is therefore an object of this invention to provide a novel means for the shape turning of machined metal parts whereby the latter, in a single cutting operation which may be conducted simultaneously with threading or other operations on the metal parts, are provided with slotted ends or with flat sides such that at least a portion of the parts will have cross-sectional forms embodying a selective number of flat sides and which forms for example, may thus be polygonal such as square, hexagonal, or octagonal.

Another object of this invention is to provide a novel, simple, and economical attachment for a conventional machine, for example for a multiple-spindle automatic screw machine, which attachment includes a single rotary cutter for shape turning flat sides on, or straight slots in the ends of, machined metal parts in a single cutting operation which may be conducted simultaneously with threading or other operation performed by the machine on the metal parts.

The specific nature of this invention as well as other objects and advantages thereof will be readily apparent from a description of a preferred embodiment as shown in the accompanying drawings, in which:

Figure 1 is a view in perspective of the attachment of this invention mounted on a conventional mutliple-spindle automatic screw machine, only pertinent portions of the latter being shown.

Figure 2 is a larger view in perspective of the attachment per se of this invention with the housing 90 removed from the gearing arrangement to show the latter.

Figure 3 is a view in vertical section taken on a plane indicated by the line 3—3 of Figure 2.

Figure 4 is a view in vertical section taken on a plane indicated by the line 4—4 of Figure 2.

Figure 5 is a view in vertical section taken on a plane indicated by the line 5—5 of Figure 2.

Figures 6 to 8a, inclusive, illustrate rotary cutters of this invention and having, respectively, one, two, and three cutting blades, for cutting flat sides on metal parts.

Figures 9 and 9a illustrate a single bladed rotary cutter of this invention for cutting straight slots in the ends of metal parts.

Figures 10 to 13, inclusive, are views, in perspective, of screws having two-sided square, hexagonal, and slotted heads, respectively formed by use of the rotary cutters of Figures 6 to 9 and while rotating at a speed of twice that of the screws.

Referring to the drawings, in Fig. 1 are indicated certain pertinent portions of a conventional six-spindle automatic screw machine, the latter being designated in general by numeral 1, with the attachment of this invention operably attached to the machine and designated in general by the numeral 2. Pertinent portions of the conventional six-spindle automatic screw machine 1 as shown more or less diagrammatically, and which are well known in the art, will now be described briefly. These portions include a driven, automatically intermittently rotatable, adjustably indexed head 10 carrying a plurality of equally spaced, parallel, rotatably driven work spindles 12 on each of which is secured a collet 14 for holding a work piece 15, to be, for example, threaded. Cross slides 16, 17, and 18, respectively known as first, second, and third positions, are adapted to carry tool holders as desired, tool holder 20 being shown carried by cross slide 18. As shown, tool holder 20 carries a conventional stationary tool indicated by numeral 22 which may be suitable for the rolling of threads on work piece 15. Mounted for selective, adjustable, relative horizontal reciprocating movement if desired on a support 23, is a tool slide 24 having tool holding slots 25 therein of inverted T-shape, tool slide 24 being connected to be driven if desired in a selective, adjustable, horizontal reciprocating manner on support 23 through suitable rack and gearing mechanism (not shown) by means of a drive shaft 26 rotatably driven by a connection to the drive mechanism (not shown) of the screw machine. Also rotatably driven by a connection to the drive mechanism is a horizontally disposed internally splined sleeve 30 which may be rotatably driven at the same or different speeds and in the same or opposite direction as work spindles 12, splined sleeve 30 being adapted to receive and to retain horizontally slidably therein the splined end of the driving spindle of a conventional attachment tool such as a drill (not shown). A conventional connected common drive means (not shown) simultaneously rotatably drives work spindle 12, rotatably drives any attachment driving spindle the splined end of which is received in the splined sleeve 30, rotatably drives with intermittent indexed movement the head 10, and if desired, causes selective, adjustable, horizontal reciprocating movement of tool slide 24 on its support 23.

Referring now in particular to the attachment of this invention, generally indicated by numeral 2 of Fig. 1, and as best shown in Figs. 2 to 5, numeral 40 designates the attachment driving spindle having a splined end thereof receivably retainable and horizontally slidable in the splined sleeve 30 which is rotatably driven by the drive mechanism (not shown) as heretofore discussed. At the other end of attachment driving spindle 40, which may, if desired, be rotatably driven at the same speed and in the same relative direction as work spindles 12, as heretofore indicated with respect to splined sleeve 30, is keyed a gear 42 in meshing engagement with a gear 44, the latter being pinned to a bushing 45 at one end thereof, bushing 45 being rotatably mounted on a reduced end of a fixed hinge pin 60. Also pinned to bushing 45, and at the other end thereof, is a gear 46 is meshing engagement with a gear 48, the latter being keyed to a rotatable tool spindle 50 at one end thereof. In a preferred embodiment of this invention, tool spindle 50 is drive rotatable at a speed twice that of work spindles 12 and in the same direction relative thereto. This may be accomplished by gears 42 and 44, each having the same number of teeth and with gear 46 having twice the number of teeth of gear 48. For example, gears 42 and 44 each may have 45 teeth, gear 46 may have 60 teeth, and gear 48 may have 30 teeth. Attachment driving spindle 40 is journalled in, and supported near the end thereof, carrying gear 42 by a support member 52 adjustably securable to tool slide 24 in a slot 25 of the latter by means of bolt 54 of inverted T-shape. Also similarly adjustably securable to tool slide 24 in a slot 25 thereof, by means of additional identical bolts 54 of inverted T-shape, is a spindle carrier adapter 56 having two spaced lower hinge pin carrying end portions 57, in which is fixed the hinge pin 60 at a space on the latter adjacent to the reduced end portion thereof, on which bushing 45 is rotatably mounted. A spindle carrier member 64 comprising two spaced identical portions 65 is shown hingedly mounted on hinge pin 60, and each of the two spaced spindle carrier member portions 65 is adjustably secured by means of nuts on pivoted elevating studs 66 to spindle carrier adapter 56. Between gear 48 and the nearest spindle carrier portion 65 is a spacer 88 keyed to tool spindle 50. Between the two spaced spindle carrier portions 65 is a brake member 68 also shown hingedly mounted on hinge pin 69 and adjustably secured to spindle carrier adapter 56 by means of nuts 75 on pivoted bolt 70. Brake member 68 has a semi-circular portion 71 of slightly greater radius than that of tool spindle 50 and is adapted to spacedly surround a portion of, or substantially half of the circumference of, the latter. The function of brake member 68 is to reduce or to eliminate back lash during operation of the attachment, and for this purpose a brake lining 72 is shown secured to brake member 68 at portion 71 thereof.

Tool spindle 50 is rotatably mounted in each of the two spaced spindle carrier portion members 65 by means of respective identical roller bearings 76, and it will be apparent that brake member 68 with brake lining 72 thereon is readily and selectively adjustable by manipulation of nuts 75 on bolt 70 to obtain any desired degree of pressure of brake lining 72 against tool spindle 50 to reduce or eliminate back lash of the latter during operation. On the end of tool spindle 50, opposite to the end thereof on which gear 48 is keyed, is an internally threaded arbor portion 80, and secured to the latter by means of screw 84 is an arbor or an adapter 82 and a rotary cutter which, as shown in Figs. 1 and 2, may have two blades for the purpose of cutting flat sides on a work piece. However, it is to be understood that the exact number of blades on the rotary cutter, or the type of the latter, depends upon the type of operation desired and the relative speeds of rotation of the tool spindle 50 and the metal part or work piece 15, as hereinafter described. In Figs. 6 to 8, inclusive, are shown examples of rotary cutters with respectively one, two, and three blades of a type suitable for cutting flat sides on at least a portion of the longitudinal length of machined metal parts. If the rotary cutter has two or more blades, it is essential for the purposes of this invention that such blades be equally spaced circumferentially on the cutter. In Fig. 9 is shown an example of a rotary cutter with a single cutting blade projecting longitudinally from the cutter and spaced from and parallel to the axis of the latter, this type of rotary cutter being suitable for the cutting of straight slots in and across the projecting ends or heads of metal parts or work pieces 15.

Operation of the attachment of this invention with the particular embodiment thereof as above described will now be explained by way of a specific example, wherein the attachment is operatively connected to a multiple-spindle automatic screw machine of the above described type, and wherein splined sleeve 30 of the drive mechanism is operably rotatable at the same speed as work spindles 12 and in the same relative direction. Under these conditions, it will be seen that with the spined end of attachment driving spindle 40 slidably received in splined sleeve 30, and with the attachment secured by bolts 54 to the tool slide 24, the tool spindle 50, through gears 42, 44, 46, and 48, will rotate at a speed twice that of work spindles 12 and in the same relative direction as the latter, while the entire attachment, together with tool slide 24, will, if desired, reciprocate horizontally in adjustably desired movement synchronized with intermittent indexed movement of head 10. In this example of operation, it will be assumed that it is desired to produce screws with square heads, and for this purpose the cutter shown in Figs. 7 and 7a, with two blades, will be secured to the arbor end of tool spindle 50. A cutter of about 1 to 1½ inches in radius from axis to blade tip has been found to be suitable for producing the flat sides on screws with ½ inch square heads, that is, the distance between opposite flat sides on the heads is ½ inch. By means of elevating studs 66, the axis of tool spindle 50, and hence of the cutter, is adjusted to the proper operative distance from the axis of work piece 15, which latter may be in the aforesaid third position, as shown in Fig. 1. This proper operative distance may be determined by trial; and is, of course, dependent upon the radius of the cutter and also upon the desired distance between opposite flat sides to be formed on the work piece. By means of bolts 54, the attachment is adjusted through trial to proper position on tool slide 24 such that the cutter will engage the work piece for a sufficient distance horizontally to produce flat sides of the desired longitudinal length on the work piece and during horizontal reciprocating movement of the attachment and tool slide 24. In this example, tool holder 20 holds a suitable tool 22 for rolling threads on work pieces 15.

In the foregoing example, it will be seen that operation is automatic, and that, as head 10 moves indexedly to the third position, tool 22 starts rolling threads on work piece 15, while simultaneously the two-bladed cutter on tool spindle 50 is, or may be, moved horizontally in cutting engagement with the side of the end or head of work piece 15. Inasmuch as the cutter is rotating at twice the speed of work piece 15, one of the blades, during rotation of the cutter, will produce a first substantially straight cut on the side of the work piece, and the other of the blades will then produce a second substantially straight cut at a point 90° circumferentially, or at an angle of 90°, to the first cut; the one of the blades will then produce a third cut substantially parallel to and opposite the first cut, and the other of the blades will then produce a fourth cut substantially parallel to and opposite the first cut. It will thus be seen that as the attachment with the cutter thereon moves horizontally, if desired, a square head is formed on the screw being produced, and the flat sides of the square head are of predetermined length longitudinally. Upon completion of the threading and the cutting of the flat sides, the head 10 undergoes an automatic indexing movement while the attachment selectively moves in a reverse horizontal direction in an automatic reciprocating movement. Fig. 11 illustrates a square head screw thus produced.

In the foregoing operation, with the speed of rotation of the cutter twice that of the work piece, the use of a single bladed cutter, as shown in Figs. 6 and 6a, instead of the two-bladed cutter, would produce two opposite flat sides on the screw head, as shown in Fig. 10; the use of a three-bladed cutter, as shown in Figs. 8 and 8a, would produce six flat sides or a hexagonal head, as shown in Fig. 12; the use of a cutter with additional blades would produce additional flat sides, for example the use of a four-bladed cutter would produce eight flat sides or an octagonal head; and the use of the cutter as shown in Figs. 9 and 9a would produce a straight diametrical end slot, as shown in the slotted head screw of Fig. 13. It will be apparent that if the speed of rotation of the cutter is not twice that of the work piece, in the foregoing operation, a different result would be obtained. Thus, for example, with the rotation speed of the cutter four times that of the work piece, use of the two-bladed cutter would produce eight flat sides, or use of the cutter of Fig. 9 would result in two diametrical end slots crossing at right angles at the axis of the work piece.

While this invention has been described in a preferred form or embodiment, it is to be understood that various changes or modifications therein, as will be apparent to those skilled in the art after understanding this invention, may be made without departing from the spirit or scope of this invention as set forth in the appended claims.

The invention described in the foregoing specification and claims may be manufactured and used by or for the Government for governmental purposes without the payment to me of any royalty thereon.

I claim:

1. An attachment of the character described comprising, in combination, a drive spindle adapted to be rotatably driven through one end thereof by drive mechanism, a support member for said drive spindle, the other end of said drive spindle being rotatably mounted in said support member, a tool spindle carrier support member, a hinge pin fixedly supported in a bottom portion of said spindle carrier support member, a tool spindle carrier hingedly mounted on said hinge pin, means for adjustably positioning said tool spindle carrier at an upper portion thereof at a desired distance of the latter from said spindle carrier support member, a tool spindle rotatably mounted in said upper portion of said tool spindle carrier, gearing operatively connecting the other end of said drive spindle to one end of said tool spindle, a bladed rotary cutter secured to the other end of said tool spindle, a brake element hingedly mounted at one portion thereon on said hinge pin, and adjustable means at another portion of said brake element providing adjustable hinged movement of the latter whereby desired braking pressure of said brake element may be applied on said tool spindle to prevent back lash during operation of the attachment.

2. The attachment of claim 1, wherein said bladed rotary cutter has a blade thereon projecting in a direction parallel to the axis of said cutter and from a radially outer portion of the latter, to cut straight slots in an end of a work piece when the latter and said cutter are rotating simultaneously.

3. The attachment of claim 1, wherein said bladed rotary cutter has a blade thereon extending radially outward from the center of said cutter and in a direction perpendicular to the axis thereof to cut flat sides on a work piece when the latter and said cutter are rotating simultaneously in the same relative direction and in relative adjusted cutting position.

4. The attachment of claim 1, wherein said bladed rotary cutter has a plurality of cutting blades equally spaced circumferentially on the body portion of said cutter and extending radially outward from the axis of the latter, to cut a plurality of equally spaced flat sides on a work piece parallel to the axis thereof when said work piece and said cutter are rotating in the same relative direction in adjusted relative cutting position.

5. The attachment as set forth in claim 1, wherein said gearing includes gears of 2:1 ratio whereby said tool spindle is rotatable at twice the speed and in the same relative direction as said drive spindle.

6. An attachment of the character described comprising, in combination, a drive spindle adapted to be rotatably driven through one end thereof by drive mechanism, a support member for said drive spindle, the other end of said drive spindle being rotatably mounted in said support member, a tool spindle carrier support member, a hinge pin fixedly supported in a bottom portion of said spindle carrier support member, a tool spindle carrier hingedly mounted on said hinge pin, means for adjustably positioning said tool spindle carrier at an upper portion thereof at a desired distance of the latter from said spindle carrier support member, a tool spindle rotatably mounted in said upper portion of said tool spindle carrier, gearing operatively connecting the other end of said drive spindle to one end of said tool spindle, bladed rotary cutter securing means at the other end of said tool spindle, a brake element hingedly mounted at one portion thereof on said hinge pin, and adjustable means at another portion of said brake element providing adjustable hinged movement of the latter whereby desired braking pressure of said brake element may be applied on said tool spindle to prevent back lash during operation of the attachment.

STEVE M. KULUSIC.

References Cited in the file of this patent

UNITED STATES PATENTS

| Number | Name | Date |
|---|---|---|
| 1,485,687 | Melling | Mar. 4, 1924 |
| 1,485,689 | Melling | Mar. 4, 1924 |
| 1,796,992 | Helm et al. | Mar. 17, 1931 |
| 2,096,134 | Raber et al. | Oct. 19, 1937 |
| 2,423,696 | Fink | July 8, 1947 |
| 2,555,616 | Swartz | June 5, 1951 |
| 2,555,617 | Swartz et al. | June 5, 1951 |

FOREIGN PATENTS

| Number | Country | Date |
|---|---|---|
| 497,531 | Great Britain | Dec. 21, 1938 |